US008520480B2

(12) United States Patent
Aoki et al.

(10) Patent No.: US 8,520,480 B2
(45) Date of Patent: Aug. 27, 2013

(54) OPTICAL DISC APPARATUS, METHOD OF CONTROLLING THE SAME, AND INFORMATION STORAGE MEDIUM

(75) Inventors: Toshimasa Aoki, Tokyo (JP); Satoshi Mimura, Tokyo (JP); Takashi Enokihara, Ibaraki (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 339 days.

(21) Appl. No.: 12/437,122

(22) Filed: May 7, 2009

(65) Prior Publication Data
US 2009/0290466 A1 Nov. 26, 2009

(30) Foreign Application Priority Data
May 26, 2008 (JP) .................................. 2008-136781

(51) Int. Cl.
*G11B 7/00* (2006.01)
(52) U.S. Cl.
USPC ........................................................ 369/53.31
(58) Field of Classification Search
None
See application file for complete search history.

(56) References Cited

U.S. PATENT DOCUMENTS

| 2003/0012096 A1* | 1/2003 | Kitaoka et al. | 369/44.29 |
| 2004/0213115 A1* | 10/2004 | Nakata et al. | 369/53.23 |
| 2005/0052977 A1* | 3/2005 | Sun | 369/53.23 |
| 2008/0025186 A1 | 1/2008 | Kobayashi | |
| 2009/0080305 A1* | 3/2009 | Lee | 369/53.22 |
| 2009/0252003 A1* | 10/2009 | Takahashi et al. | 369/44.32 |

FOREIGN PATENT DOCUMENTS

| JP | 2007-052896 | 3/2007 |
| JP | 2008-052857 | 3/2008 |

OTHER PUBLICATIONS

Notice of Rejection with partial translation dated Apr. 6, 2010, for corresponding Japanese Patent Application No. 2008-136781.

* cited by examiner

*Primary Examiner* — Joseph Haley
*Assistant Examiner* — Emily Frank
(74) *Attorney, Agent, or Firm* — Katten Muchin Rosenman LLP

(57) ABSTRACT

An optical disc apparatus includes an optical pickup for outputting an output signal according to reflected light from an optical disc medium, measures a level of a reflected signal corresponding to reflected light from a medium surface prior to reading of information recorded on the medium, predicts, based on the measured level of the reflected signal, whether or not the reflected signal from the medium surface will satisfy a predetermined detection condition when a focus state is to be detected, and uses a result of the predicting to detect a state where the output signal satisfies the predetermined detection condition as a state where a focus of an objective lens included in the optical pickup is on a signal surface of the medium while relatively moving the objective lens with respect to the medium surface when the information recorded on the medium is to be read therefrom.

5 Claims, 4 Drawing Sheets

OPTICAL DISC APPARATUS, METHOD OF CONTROLLING THE SAME, AND INFORMATION STORAGE MEDIUM

BACKGROUND OF THE INVENTION

1. Field of the Invention

The present invention relates to an optical disc apparatus for reading information recorded on an optical disc medium such as a CD, a DVD, and a Blu-ray Disc™, a method of controlling the optical disc apparatus, and an information storage medium.

2. Description of the Related Art

In recent years, various types of optical disc media have been used as information recording media. In general, the optical disc medium has a structure in which a plurality of layers such as a data recording layer for recording information thereon and a protective layer for protecting the data recording layer are laminated. In order to read the information recorded on such an optical disc medium, an optical disc apparatus is used. The optical disc apparatus includes an optical pickup for irradiating the optical disc medium with light to detect light reflected from the optical disc medium.

When the optical disc apparatus reads the information recorded on the optical disc medium, it is necessary to adjust a focus of an objective lens included in the optical pickup to be on a signal surface (surface of the data recording layer) of the optical disc medium. Therefore, when the information is read, the optical disc apparatus performs a focus detection operation for detecting a focus state where the focus of the objective lens is on the signal surface based on an output signal from the optical pickup (for example, see Japanese Patent Application Laid-open No. 2007-052896). Specifically, the optical disc apparatus judges whether or not the output signal from the optical pickup satisfies a predetermined detection condition while relatively moving the objective lens of the optical pickup with respect to a surface of the optical disc medium (medium surface). Then, when the output signal satisfies the predetermined detection condition, the optical disc apparatus judges that the focus of the objective lens is on the signal surface.

SUMMARY OF THE INVENTION

When the optical disc apparatus described above performs the focus detection operation, there is a possibility that not only a reflected signal generated by reflection from the signal surface, but also a reflected signal generated by reflection from the medium surface of the optical disc medium (medium surface reflection) may satisfy the detection condition for focus detection, depending on the setting of the detection condition. In this case, there is a fear that a state where the focus of the objective lens is on the medium surface of the optical disc medium may be erroneously detected as the state where the focus of the objective lens is on the signal surface of the optical disc medium. Therefore, in order to avoid such a problem, it is necessary to determine the detection condition for detecting the focus state to enable the detection of only the output signal generated by the reflection from the signal surface in consideration of a difference between the output signal generated by the medium surface reflection and that generated by the reflection from the signal surface. For some types of optical disc media, however, the difference between the signal generated by the medium surface reflection and the signal generated by the reflection from the signal surface is small. Therefore, there may be a case where it is difficult to set the detection condition which allows only the signal generated by the reflection from the signal surface to be detected.

The present invention has been made in view of the actual condition described above, and has an object of providing an optical disc apparatus capable of detecting a state where a focus of an objective lens is on a signal surface even when a difference between an output signal generated by reflection from a medium surface and an output signal generated by reflection from a signal surface is small, a method of controlling the optical disc apparatus, and an information storage medium.

In order to solve the above-mentioned problem, according to the present invention, an optical disc apparatus for reading information recorded on an optical disc medium, includes: an optical pickup including an objective lens, for outputting an output signal according to reflected light from the optical disc medium; a drive unit for relatively moving the objective lens included in the optical pickup with respect to a medium surface of the optical disc medium in a direction of changing a distance to the medium surface; focus detection means for detecting a state where the output signal from the optical pickup satisfies a predetermined detection condition as a focus state where a focus of the objective lens is on a signal surface of the optical disc medium while the objective lens is being relatively moved by the drive unit with respect to the medium surface, for reading the information recorded on the optical disc medium; signal level measurement means for measuring a level of a reflected signal corresponding to reflected light from the medium surface prior to the reading of the information recorded on the optical disc medium; and prediction means for predicting, based on the measured level of the reflected signal, whether or not the reflected signal from the medium surface will satisfy the predetermined detection condition, for the detecting of the focus state, in which the focus detection means uses a result of the predicting to detect the focus state.

In the above-mentioned optical disc apparatus, the signal level measurement means may further measure a level of a reflected signal corresponding to reflected light from the signal surface, and the prediction means may perform the predicting based on a ratio between the level of the reflected signal from the medium surface and the level of the reflected signal from the signal surface.

In the above-mentioned optical disc apparatus, when the prediction means predicts that the reflected signal from the medium surface will satisfy the predetermined detection condition, the focus detection means may detect the focus state after the level of the output signal exceeds a predetermined value and then becomes less than the predetermined value again while the objective lens is being relatively moved in a direction becoming closer to the medium surface.

According to the present invention, a method of controlling an optical disc apparatus for reading information recorded on an optical disc medium, the optical disc apparatus including: an optical pickup including an objective lens, for outputting an output signal according to reflected light from the optical disc medium; and a drive unit for relatively moving the objective lens included in the optical pickup with respect to a medium surface of the optical disc medium in a direction of changing a distance to the medium surface, includes: a focus detection step of detecting a state where the output signal from the optical pickup satisfies a predetermined detection condition as a focus state where a focus of the objective lens is on a signal surface of the optical disc medium while the objective lens is being relatively moved by the drive unit with respect to the medium surface, for reading the information recorded on the optical disc medium; a signal level measurement step of measuring a level of a reflected signal corresponding to reflected light from the medium surface prior to the reading of the information recorded on the optical disc medium; and a prediction step of predicting, based on the measured level of the reflected signal, whether or not the reflected signal from the medium surface will satisfy the predetermined detection condition, for the detecting of the focus state, in which the focus detection step includes using a result of the predicting to detect the focus state.

According to the present invention, a computer readable information storage medium stores a program for controlling an optical disc apparatus for reading information recorded on an optical disc medium, the optical disc apparatus including: an optical pickup including an objective lens, for outputting an output signal according to reflected light from the optical disc medium; and a drive unit for relatively moving the objective lens included in the optical pickup with respect to a medium surface of the optical disc medium in a direction of changing a distance to the medium surface, the program controlling the computer to function as: focus detection means for detecting a state where the output signal from the optical pickup satisfies a predetermined detection condition as a focus state where a focus of the objective lens is on a signal surface of the optical disc medium while the objective lens is being relatively moved by the drive unit with respect to the medium surface, for reading the information recorded on the optical disc medium; signal level measurement means for measuring a level of a reflected signal corresponding to reflected light from the medium surface prior to the reading of the information recorded on the optical disc medium; and prediction means for predicting, based on the measured level of the reflected signal, whether or not the reflected signal from the medium surface will satisfy the predetermined detection condition, for the detecting of the focus state, in which the focus detection means uses a result of the predicting to detect the focus state.

DETAILED DESCRIPTION OF THE INVENTION

Hereinafter, an exemplary embodiment of the present invention is described in detail referring to the accompanying drawings.

Figure 1:
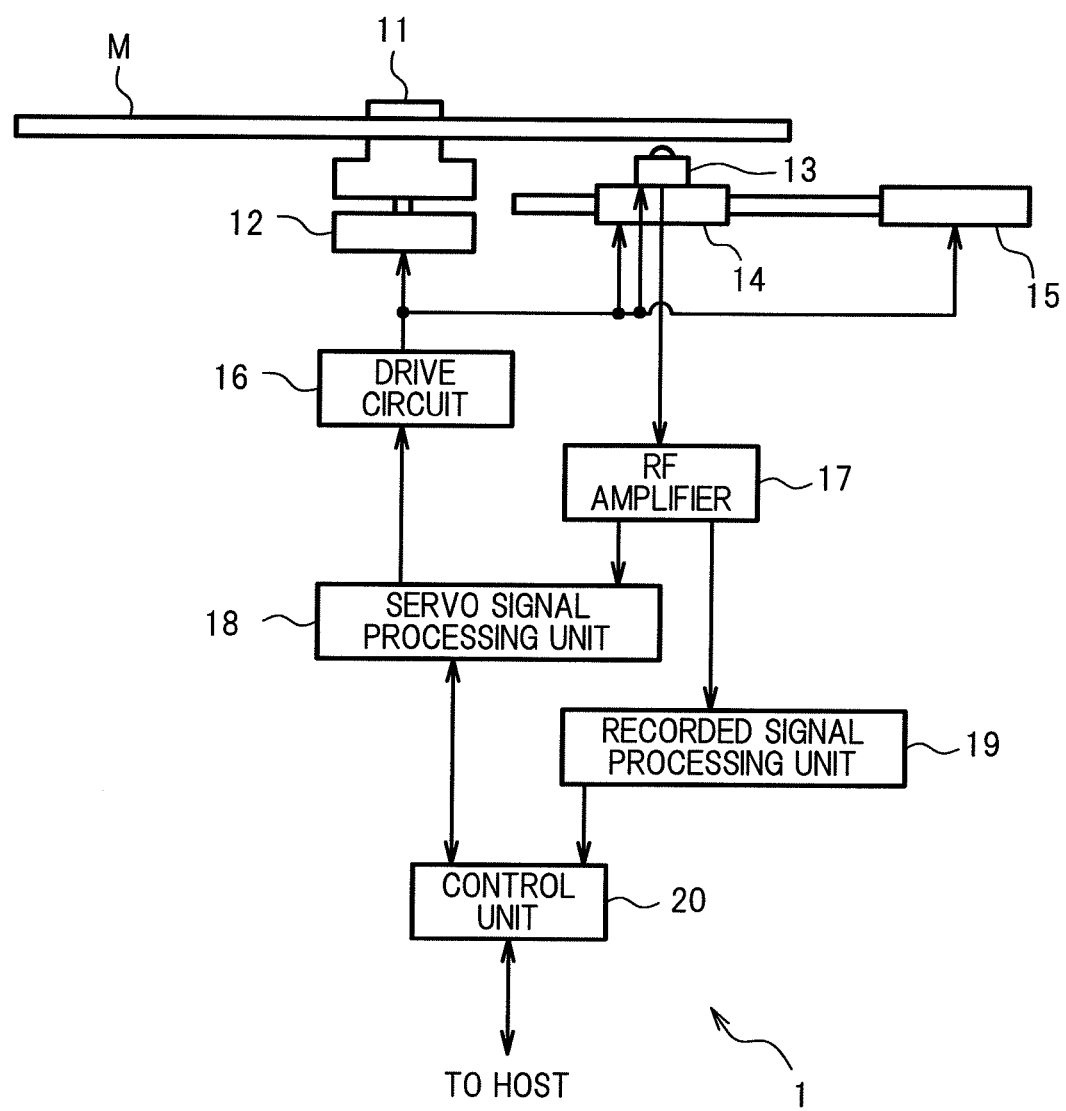
FIG. 1 is a block diagram illustrating a configuration example of an optical disc apparatus according to an embodiment of the present invention.

An optical disc apparatus 1 according to the embodiment of the present invention reads information recorded on an optical disc medium. As illustrated in FIG. 1, the optical disc apparatus 1 includes a medium supporting portion 11, a spindle motor 12, an optical pickup 13, a three-axis actuator 14, a feed motor 15, a drive circuit 16, an RF amplifier 17, a servo signal processing unit 18, a recorded signal processing unit 19, and a control unit 20.

An optical disc medium M, from which the information is to be read by the optical disc apparatus 1, includes one or more data recording layers on which the information is recorded, and protective layers for protecting the data recording layers, which are provided on both sides of the data recording layers. Hereinafter, a surface of each data recording layer is referred to as a signal surface. The optical disc apparatus 1 may be configured not only to read the recorded information from the optical disc medium M but also to be capable of writing the information to the optical disc medium M. Further, the optical disc apparatus 1 may also be configured to be capable of reading the information recorded on a plurality of types of optical disc media M such as a CD, a DVD, and a Blu-ray disc.

The medium supporting portion 11 rotatably supports the optical disc medium M. The medium supporting portion 11 also rotates the optical disc medium M using power transmitted from the spindle motor 12.

The optical pickup 13 irradiates the optical disc medium M with light, and detects that part of the radiated light that is reflected by the optical disc medium M to output an output signal according to the detected reflected light. The optical pickup 13 can be moved by the three-axis actuator 14 in two directions including a diameter direction of the optical disc medium M and a direction vertical to the medium surface of the optical disc medium M (that is, a direction along a rotation axis of the optical disc medium M). Further, the three-axis actuator 14 can change the relative tilt of the optical pickup 13 with respect to the optical disc medium M. The three-axis actuator 14 moves the optical pickup 13 in the direction vertical to the medium surface of the optical disc medium M to vary a distance from an objective lens 36 included in the optical pickup 13 to the medium surface of the optical disc medium M.

Figure 2:
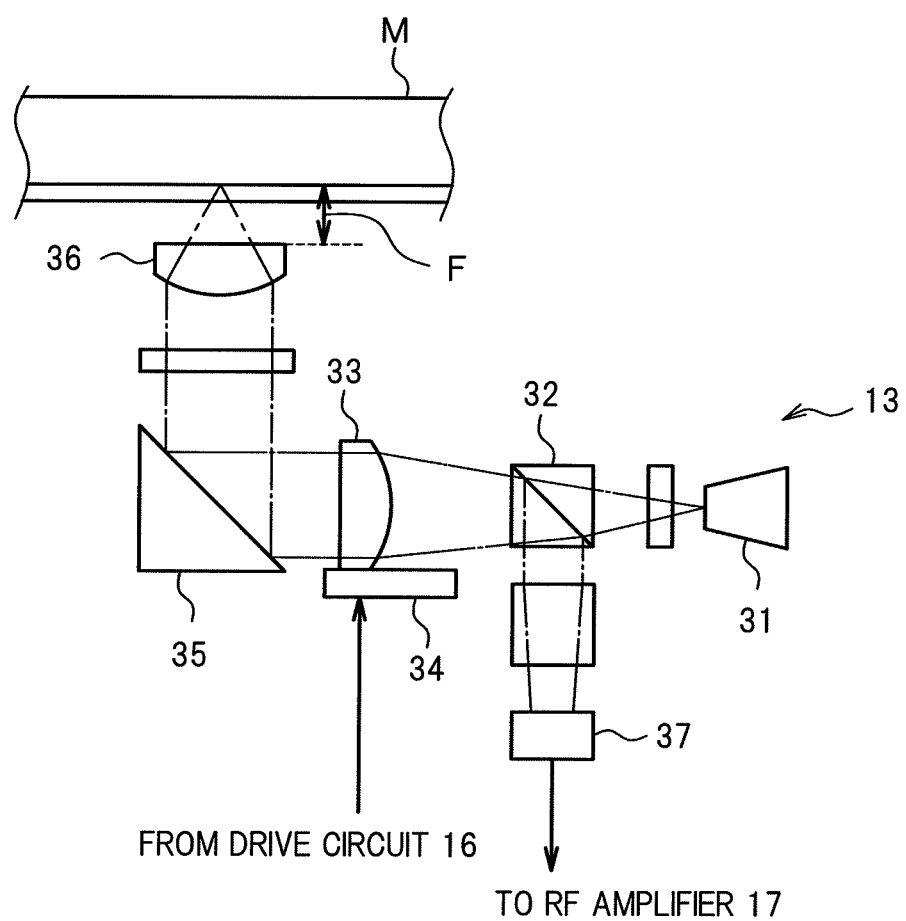
FIG. 2 is a schematic view illustrating an internal configuration example of an optical pickup of the optical disc apparatus according to the embodiment of the present invention.

FIG. 2 is a view illustrating an internal configuration example of the optical pickup 13. In the example illustrated in FIG. 2, the optical pickup 13 includes a light-emitting element 31, a polarization beam splitter 32, a collimator lens 33, a collimator lens driving unit 34, an erecting mirror 35, the objective lens 36, and a photodetector 37.

The light-emitting element 31 is a semiconductor laser element for outputting a laser beam having a predetermined wavelength. The output light emitted from the light-emitting element 31 passes through the polarization beam splitter 32 and the collimator lens 33, and is then reflected by the erecting mirror 35. Further, the output light reflected by the erecting mirror 35 is focused by the objective lens 36 on a focal position apart from the objective lens 36 by a focal length F to be reflected by the optical disc medium M.

After the light reflected by the optical disc medium M passes through the objective lens 36, the reflected light is reflected by the erecting mirror 35 to be guided by the polarization beam splitter 32 toward the photodetector 37. The photodetector 37 includes a plurality of light-receiving elements arranged in, for example, a matrix of N by N. When the reflected light guided by the polarization beam splitter 32 reaches the light-receiving elements, the photodetector 37 outputs a signal according to an intensity of the light received by each of the plurality of light-receiving elements as an output signal.

The collimator lens driving unit 34 includes an actuator and the like, and drives the collimator lens 33 forward and backward along an optical axis direction of the laser beam. The collimator lens driving unit 34 moves the collimator lens 33 along the optical axis direction to enable the correction of spherical aberration of the objective lens 36.

The feed motor 15 moves both the optical pickup 13 and the three-axis actuator 14 along the diameter direction of the optical disc medium M. By the driving of the feed motor 15, the optical pickup 13 can move from a position in the vicinity of the center of the optical disc medium M to the position in the vicinity of an outer periphery of the optical disc medium M.

The drive circuit 16 outputs driving signals for driving the collimator lens driving unit 34, the three-axis actuator 14, the spindle motor 12, and the feed motor 15 according to the control signal input from the servo signal processing unit 18. A rotation speed of the spindle motor 12 changes according to the driving signal from the drive circuit 16. As a result, a rotation speed of the optical disc medium M is controlled. Moreover, by driving the three-axis actuator 14 and the feed motor 15 according to the driving signals from the drive circuit 16, a distance of the objective lens 36 from the rotation axis of the optical disc medium M along the diameter direction, and a distance from the objective lens 36 to the medium surface of the optical disc medium M, are controlled. In this embodiment, the drive circuit 16 and the three-axis actuator 14 function as a drive unit for relatively moving the objective lens 36 with respect to the medium surface of the optical disc medium M.

The RF amplifier 17, the servo signal processing unit 18, the recorded signal processing unit 19, and the control unit 20 are realized by, for example, an A/D converter for converting the output signal from the optical pickup 13 into a digital signal, and a digital signal processor (DSP), a microcomputer, or the like, for processing the digital signal obtained by the conversion.

The RF amplifier 17 outputs various signals based on the respective output signals of the plurality of light-receiving elements, which are output from the optical pickup 13. Specifically, the RF amplifier 17 amplifies the output signal from each of the light-receiving elements with a given gain to output the obtained signal as an RF signal for data reproduction. The RF amplifier 17 also outputs a pull-in signal (PI signal) obtained by adding all the amplified output signals of the plurality of light-emitting elements. A level of the pull-in signal represents a total level of the output signals output from the optical pickup 13.

Moreover, the RF amplifier 17 calculates and outputs a focus error signal (FE signal) indicating a deviation of the focal position of the objective lens 36 with respect to the signal surface of the optical disc medium M. As an example, the FE signal is calculated by subtracting the sum of the output signals of the light-receiving elements arranged along a predetermined diagonal direction from the sum of the output signals of the light-receiving elements arranged along a diagonal direction crossing the predetermined diagonal direction from among the plurality of light-receiving elements. Further, the RF amplifier 17 calculates and outputs a tracking error signal (TE signal) indicating a deviation in the diameter direction of the optical disc medium M between a position of a track in the data recording layer, on which the information is recorded, and the focal position of the objective lens 36.

Figure 3:
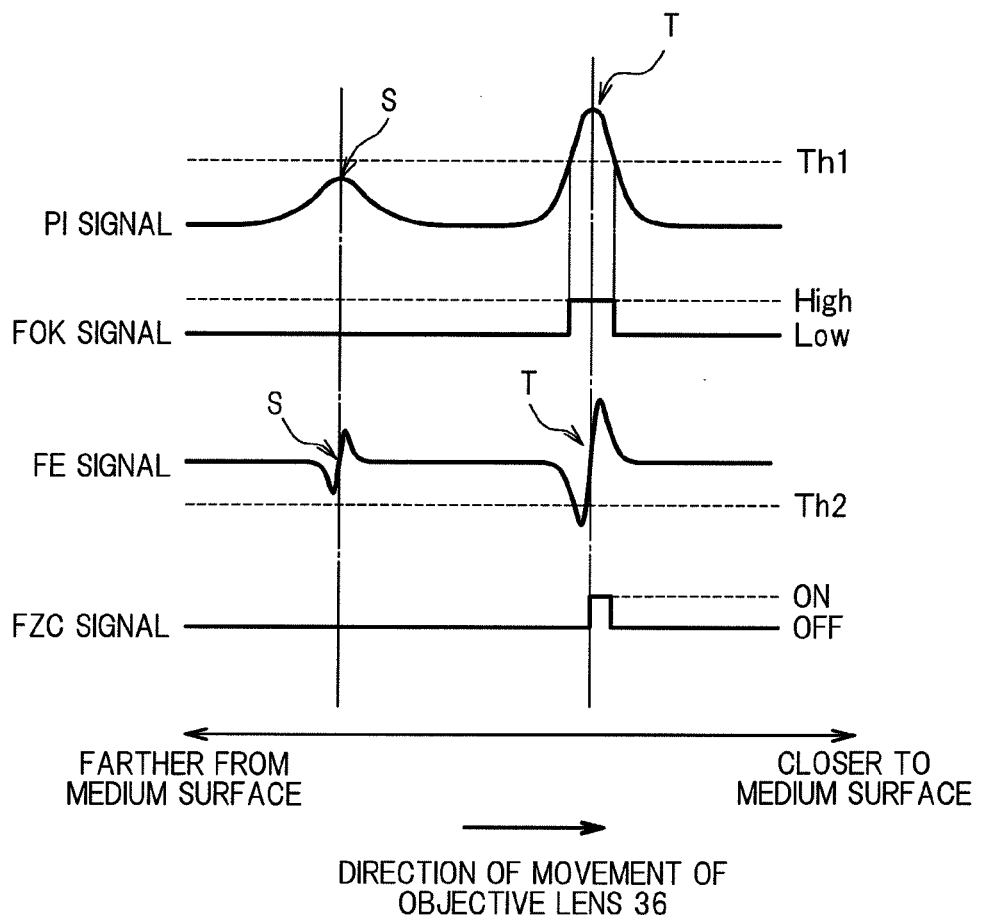
FIG. 3 is an explanatory graph showing an example of signals output from an RF amplifier and a servo signal processing unit in the optical disc apparatus according to the embodiment of the present invention.

Now, an example of waveforms of the PI signal and the FE signal when the objective lens 36 is brought closer to the medium surface of the optical disc medium M at constant speed is described referring to FIG. 3. As shown in FIG. 3, when a level of the PI signal is measured while the objective lens 36 is being brought closer to the medium surface of the optical disc medium M, the waveform of the PI signal exhibits a peak in a state where the focus of the objective lens 36 is on the medium surface or the signal surface of the optical disc medium M. In the example shown in FIG. 3, a peak due to a reflected signal corresponding to light reflected from the medium surface of the optical disc medium (hereinafter, referred to as a medium surface-reflected signal S) and a peak due to a reflected signal corresponding to light reflected from the signal surface (hereinafter, referred to as a signal surface-reflected signal T) are shown. When a level of the FE signal is measured while the objective lens 36 is being brought closer to the medium surface of the optical disc medium M, the level of the FE signal approaches a negative peak as the focal position gets closer to the medium surface of the optical disc medium M to exhibit the negative peak. Then, when the focal position of the objective lens 36 is on the medium surface of the optical disc medium M, the level of the FE signal becomes approximately zero. Thereafter, immediately after the focal position of the objective lens 36 passes through the medium surface of the optical disc medium M, the level of the FE signal exhibits a positive peak. Even when the focal position of the objective lens 36 passes through the signal surface of the optical disc medium M, the negative peak first appears, as in the case of the passage of the focal position through the medium surface of the optical disc medium M. Then, after the passage of the level of the FE signal through zero, the level of the FE signal exhibits the positive peak.

The servo signal processing unit 18 generates various signals for servo control based on the PI signal, the FE signal, the TE signal, and the like, which are output from the RF amplifier 17, and outputs the thus generated signals to the control unit 20. The servo signal processing unit 18 also outputs control signals for driving the three-axis actuator 14, the collimator lens driving unit 34, the feed motor 15, and the spindle motor 12 to the drive circuit 16 in response to a command input from the control unit 20.

As a specific example, the servo signal processing unit 18 outputs a value indicating the peak level of the PI signal to the control unit 20. The servo signal processing unit 18 also outputs a signal indicating whether or not the level of the PI signal exceeds a predetermined PI signal threshold value Th1 (focus OK (FOK) signal). In this embodiment, when the level of the PI signal is equal to or higher than the PI signal threshold value Th1, a level of the FOK signal becomes High. On the other hand, when the level of the PI signal is lower than the PI signal threshold value Th1, the level of the FOK signal becomes Low. Further, the servo signal processing unit 18 performs predetermined processing using a predetermined FE signal threshold value Th2 on the FE signal, and outputs a signal indicating the result of the predetermined processing (focus zero cross (FZC) signal) to the control unit 20. Specifically, in this embodiment, in the case where the objective lens 36 is gradually brought closer to the medium surface of the optical disc medium M, the signal (FZC signal) indicating that the focus of the objective lens 36 is on the signal surface is output when an absolute value of the FE signal exceeds the FE signal threshold value Th2 to exhibit the negative peak and then becomes zero again (that is, when the FE signal crosses zero).

FIG. 3 also shows an example of each of outputs of the FOK signal and the FZC signal described above. In the example shown in FIG. 3, since the level of the PI signal does not exceed the PI signal threshold value Th1 at the peak due to the medium surface-reflected signal S, the level of the FOK signal does not become High. On the other hand, since the level of the PI signal exceeds the PI signal threshold value Th1 at the peak due to the signal surface-reflected signal T, a High level signal is output as the FOK signal in correspondence the signal surface-reflected signal T. Moreover, since the absolute value of the negative peak generated in the FE signal due to the medium surface-reflected signal S does not exceed the FE signal threshold value Th2, the FZC signal does not become ON. On the other hand, since the absolute value of the negative peak generated due to the signal surface-reflected signal T exceeds the FE signal threshold value Th2, a pulse indicating that the FZC signal becomes ON is output at the zero-crossing timing of the FE signal. As described above, the optical disc apparatus 1 can detect the signal surface-reflected signal T by using one of the detection of the High level signal of the FOK signal and the detection of the FZC signal, or the combination thereof.

The recorded signal processing unit 19 demodulates the RF signal output from the RF amplifier 17 into a digital signal indicating the information recorded on the optical disc medium M, and outputs the demodulated signal to the control unit 20. The recorded signal processing unit 19 also calculates an evaluation value (such as RF amplitude or jitter value) indicating reading accuracy of the optical pickup 13 for the information recorded on the optical disc medium M in response to rise timing of the waveform of the RF signal or the like, and outputs the calculated evaluation value to the control unit 20.

The control unit 20 is constituted by, for example, a microcomputer, and includes an execution module and a storage element. In the storage element of the control unit 20, a program to be executed and various parameters are stored. The execution module performs processing according to the program stored in the storage element. Specifically, the control unit 20 receives the input of signals from the servo signal processing unit 18 (such as a signal for the result of peak detection of the PI signal and a signal for the processing result of the FE signal), and performs processing (focus detection processing) for detecting a position at which the focus of the objective lens 36 is adjusted to be on the signal surface, based on the signals, and for setting a distance between the optical pickup 13 and the optical disc medium M to be at the detected position. The focus detection processing is described later.

The control unit 20 is connected to a personal computer, a main body of a home game machine, a video decoder or the like, which serves as a host. In response to a request from the host, the control unit 20 outputs an instruction for driving the feed motor 15 or the three-axis actuator 14 to the servo signal processing unit 18 to move the focal position of the objective lens 36 (that is, information reading position on the optical disc medium M) to a desired position on the optical disc medium M. In addition to the operation described above, the control unit 20 outputs an instruction for changing a rotation speed of the spindle motor 12 to the servo signal processing unit 18, to adjust the rotation speed of the optical disc medium M. Then, in this state, the control unit 20 outputs the signal obtained by demodulating the signal read from the optical disc medium M, which is output from the recording signal processing unit 19, to the host side.

Figure 4:
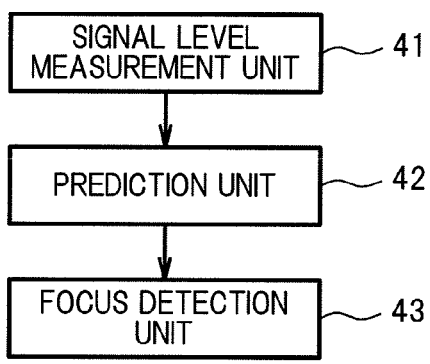
FIG. 4 is a functional block diagram illustrating an example of functions of the optical disc apparatus according to the embodiment of the present invention.

Hereinafter, processing performed by the control unit 20 of the optical disc apparatus 1 in this embodiment is described. The control unit 20 functionally includes a signal level measurement unit 41, a prediction unit 42, and a focus detection unit 43, as illustrated in FIG. 4. The functions are realized in the form of software by the execution of the program stored in the storage element included in the control unit 20 by the control unit 20.

The signal level measurement unit 41 measures the level of the medium surface-reflected signal S (specifically, level of the PI signal due to the reflection from the medium surface) prior to the start of reading or writing of the information from/to the optical disc medium M. Moreover, in this embodiment, the signal level measurement unit 41 also measures the level of the signal surface-reflected signal T (specifically, level of the PI signal due to the reflection from the signal surface).

As a specific example, in the case where the optical disc apparatus 1 is compatible with a plurality of types of optical disc media, the optical disc apparatus 1 is required to first determine the type of the optical disc medium M when the optical disc medium M is newly placed in the optical disc apparatus 1, or when the optical disc apparatus 1 is powered ON. In this type determination processing, for example, the medium surface-reflected signal S and the signal surface-reflected signal T are detected. A distance between the medium surface of the optical disc medium M and the signal surface of the optical disc medium M is calculated based on a difference between the position of the objective lens 36 for detecting the medium surface-reflected signal S and that of the objective lens 36 for detecting the signal surface-detected signal T. By using the thus calculated distance, the type of the optical disc medium M is determined. Specifically, the optical disc apparatus 1 has to detect the medium surface-reflected signal S in the type determination processing. Therefore, the signal level measurement unit 41 measures the level of the PI signal due to the medium surface-reflected signal S simultaneously with the type determination processing to store the measured level of the PI signal as a medium surface-reflected signal level Ls in the storage element included in the control unit 20.

Specifically, the signal level measurement unit 41 first rotatably drives the spindle motor 12 to start rotating the optical disc medium M, and drives the three-axis actuator 14 to move the objective lens 36 of the optical pickup 13 to its most distant position (initial position) from the medium surface of the optical disc medium M. The initial position corresponds to a position where the focal position of the objective lens 36 is situated away from the medium surface of the optical disc medium M (on the optical pickup 13 side).

Thereafter, the signal level measurement unit 41 controls the three-axis actuator 14 to start an operation of bringing the objective lens 36 closer to the medium surface of the optical disc medium M at a predetermined speed from the initial position (hereinafter, referred to as a sweep operation). Then, the signal level measurement unit 41 monitors the signals output from the servo signal processing unit 18 during the sweep operation, and detects the medium surface-reflected signal S based on the output signals. For example, when the peak of the PI signal is first detected after the start of the sweep operation, the signal level measurement unit 41 judges that the peak is due to the medium surface-reflected signal S and acquires a peak level value of the PI signal at the detection of the peak. Note that the signal level measurement unit 41 sets a gain for signal amplification performed by the RF amplifier 17 to a predetermined value prior to the start of the sweep operation. The gain set for the type determination processing has a value higher than that of a gain for focus detection processing described below, to ensure the detection of the medium surface-reflected signal S independently of the type or individual variability of the optical disc medium M. The signal level measurement unit 41 uses the value of the gain set for the RF amplifier 17 to calculate back the signal level before the signal amplification from the acquired peak value of the PI signal due to the medium surface-reflected signal S, and records the thus calculated value as the medium surface-reflected signal level Ls.

In this embodiment, subsequently to the type determination processing, the optical disc apparatus 1 performs processing of measuring physical properties of the optical disc medium M placed therein. By performing such a measurement in advance, the optical disc apparatus 1 is not required to perform an adjustment operation each time the information is to be read from or written to the optical disc medium M placed therein, even though the optical disc medium M has individual variability in physical properties. The physical properties measured in this processing include a light reflectance of the signal surface of the optical disc medium M. The reflectance is represented by the level of the signal surface-reflected signal T. Specifically, the signal level measurement unit 41 measures the level of the signal surface-reflected signal T as a part of the physical property measurement processing.

Specifically, the signal level measurement unit 41 brings back the optical lens 36 to the initial position after the type determination processing. After changing the gain of the RF amplifier 17, the signal level measurement unit 41 starts the sweep operation of the objective lens 36 again. Then, for example, the signal level measurement unit 41 judges that the highest peak of the PI signal while the level of the FOK signal is High is due to the signal surface-reflected signal T, and acquires a peak level value of the highest peak of the PI signal. Further, the signal level measurement unit 41 uses the gain which is set for the RF amplifier 17 to calculate the signal level before the signal amplification from the acquired peak level of the PI signal due to the signal surface-reflected signal T, and records the thus calculated value as a signal surface-reflected signal level Lt in the storage element included in the control unit 20. For example, when the optical disc medium M includes a plurality of data recording layers, the signal level measurement unit 41 may measure the peak level of the PI signal due to the signal surface-reflected signal T for each of a plurality of the signal surfaces to calculate the signal surface-reflected signal level Lt based on a representative value (such as average value) of the obtained peak levels.

The prediction unit 42 predicts whether or not the medium surface-reflected signal S will satisfy focus detection conditions used for the focus detection processing described below based on the medium surface-reflected signal level Ls measured by the signal level measurement unit 41. Specifically, in this embodiment, the prediction unit 42 makes a prediction based on a ratio between the medium surface-reflected signal level Ls and the signal surface-reflected signal level Lt.

A specific example of prediction processing performed by the prediction unit 42 is described below. For the focus detection processing, the focus detection unit 43 sets the gain of the RF amplifier 17 based on the signal surface-reflected signal level Lt measured by the signal level measurement unit 41 so as to allow the level of the PI signal due to the signal surface-reflected signal T to be a predetermined target value Vt. The target value Vt is a predetermined value for allowing the signal surface-reflected signal T to be detected under desirable conditions. It is considered that the ratio between the level of the PI signal due to the medium surface-reflected signal S and that of the PI signal due to the signal surface-reflected signal T remains unchanged even when the gain of the RF amplifier 17 changes. Therefore, the level of the PI signal due to the medium surface-reflected signal S, which is obtained when the gain of the RF amplifier 17 is set so as to allow the level of the PI signal due to the signal surface-reflected signal T to be the predetermined target value Vt, is calculated by the following calculation formula. In the following description, the level of the PI signal due to the medium surface-reflected signal S, which is obtained when the level of the PI signal due to the signal surface-reflected signal T becomes the target value Vt, is denoted as a predicted level Vs.

$$Vs = (Ls/Lt) \times Vt$$

As described above, the servo signal processing unit 18 outputs the High level signal as the FOK signal when the level of the PI signal exceeds the predetermined PI signal threshold value Th1. Then, the focus detection unit 43 uses the fact that the level of the FOK signal becomes High as a part of the focus detection conditions in the focus detection processing. Therefore, the prediction unit 42 predicts that the medium surface-reflected signal S will satisfy the focus detection conditions when the calculated predicted level Vs exceeds the PI signal threshold value Th1 (Vs>Th1). On the other hand, when the value of the predicted level Vs is equal to or less than the PI signal threshold value Th1 (Vs≦Th1), the prediction unit 42 predicts that the medium surface-reflected signal S will not satisfy the focus detection conditions. The prediction unit 42 outputs the result of prediction to the focus detection unit 43.

The prediction unit 42 may compare a value obtained by adding a predetermined correction value α to the PI signal threshold value Th1 with the predicted level Vs, instead of directly comparing the PI signal threshold value Th1 with the predicted level Vs. In this example, the prediction unit 42 predicts that the medium surface-reflected signal S will satisfy the focus detection conditions when the relation: Vs>(Th1+α) is satisfied. The prediction unit 42 may use a different value as the correction value α for each type of optical disc medium determined by the type determination processing. In general, a writable optical disc medium has a difference in reflectance between an area where no information is written and an area where information is already written. Therefore, by determining the correction value α according to the difference in reflectance, the prediction unit 42 can predict that the medium surface-reflected signal S will satisfy the focus detection conditions when it is assumed that the PI signal level of the medium surface-reflected signal S exceeds the PI signal threshold value Th1, regardless of whether the position to be subjected to the focus detection processing is the area where the information is already written or the area where no information is written.

The focus detection unit 43 performs the focus detection processing when the information recorded on the optical disc medium M is to be read therefrom or the information is to be written to the optical disc medium M. Specifically, the focus detection unit 43 detects a state where the output signal from the optical pickup 13 satisfies the predetermined focus detection conditions as the focus state where the focus of the objective lens 36 is on the signal surface of the optical disc medium M while the objective lens 36 is being relatively moved with respect to the medium surface of the optical disc medium M. As the focus detection conditions, for example, the following conditions are used. Specifically, the level of the PI signal exceeds the PI signal threshold value Th1 to cause the level of the FOK signal to be High. In addition, the FE signal crosses zero after exhibiting the peak exceeding the FE signal threshold value Th2 (that is, the FZC signal is detected). The PI signal threshold value Th1 is the predetermined value used for the prediction by the prediction unit 42 described above. The FE signal threshold value Th2 is a predetermined value according to the type of optical disc medium M determined by the type determination processing.

Upon detection of the focus state, the focus detection unit 43 outputs a control instruction, for turning a focus servo ON, to the focus signal processing unit 18. As a result, the three-axis actuator 14 is controlled by the focus signal processing unit 18 to follow slight vertical movement of the optical disc medium M to maintain the state where the focus of the objective lens 36 is on the signal surface. As a result, the focus state where the information can be read from or written on the signal surface is maintained.

In this embodiment, the focus detection unit 43 uses the result of prediction made by the prediction unit 42 to perform the focus detection processing. Specifically, for example, when the prediction unit 42 predicts that the medium surface-reflected signal S will not satisfy the focus detection conditions, the focus detection unit 43 performs the sweep operation of the objective lens 36 from the initial position as in a normal case. Then, when the output signal from the optical pickup 13 satisfies the focus detection conditions, the focus detection unit 43 judges that the focus of the objective lens 36 is on the signal surface. On the other hand, when the prediction unit 42 predicts that the medium surface-reflected signal S will satisfy the focus detection conditions, there is a fear that the state where the focus of the objective lens 36 is on the medium surface of the optical disc medium may be erroneously judged as the state where the focus is on the signal surface of the optical disc medium M. Therefore, the focus detection unit 43 is required to ignore the output signal from the optical pickup 13, which satisfies the focus detection conditions for the first time, as being the medium surface-reflected signal S. Therefore, for example, the focus detection unit 43 performs the sweep operation of the objective lens 36 from the initial position. Then, when the output signal from the optical pickup 13 satisfies the focus detection conditions after the level of the output signal exceeds a predetermined value and then becomes less than the predetermined value again, the focus detection unit 43 judges that the focus of the objective lens 36 is on the signal surface. As the predetermined value in this case, the PI signal threshold value Th1 is used, for example.

Hereinafter, a specific example of the focus detection processing is described based on a flowchart of FIG. 5.

The focus detection unit 43 first judges whether or not the prediction unit 42 has predicted that the medium surface-reflected signal S will satisfy the focus detection conditions (S1). When it is judged that the medium surface-reflected signal S will not satisfy the focus detection conditions, the focus detection unit 43 starts the sweep operation of the objective lens 36 (S2), and waits until the level of the FOK signal output from the servo signal processing unit 18 becomes High (S3). Then, when the High level signal is output as the FOK signal (specifically, the level of the PI signal exceeds the PI signal threshold value Th1), the focus detection unit 43 subsequently judges whether or not the FZC signal, which indicates that the FE signal crosses zero after exhibiting the peak exceeding the FE signal threshold value Th2, has been detected (S4). While the FZC signal is not detected, the focus detection unit 43 returns to Step S3 to repeat the processing described above. On the other hand, when the FZC signal is detected, the focus detection unit 43 performs control for turning the focus servo ON (S5). As a result, when the level of the FOK signal becomes High for the first time and the FZC signal is detected after the start of the sweep operation, it is judged that the focus of the objective lens 36 is on the signal surface.

On the other hand, when it is predicted in Step S1 that the medium surface-reflected signal S satisfies the focus detection conditions, the focus detection unit 43 first resets a value retained in an FOK high (FH) register included in the storage element of the control unit 20 to zero (S6). The FH register is used for counting the number of times the level of the FOK signal becomes High in subsequent processing. Thereafter, the focus detection unit 43 starts the sweep operation (S7), and waits until the level of the FOK signal output from the servo signal processing unit 18 becomes High (S8). In contrast to the above-mentioned case, when it is judged that the level of the FOK signal becomes High, the focus detection unit 43 performs increment processing for adding 1 to the value retained in the FH register, which is reset in Step S6 (S9). Then, by judging whether or not the value retained in the FH register is 1, the focus detection unit 43 judges whether or not it is the first switching from Low level to High level for the FOK signal (S10). When the value retained in the FH register is judged to be 1, the focus detection unit 43 waits until the level of the FOK signal becomes Low (S11). After the level of the FOK signal becomes Low, the focus detection unit 43 returns to Step S8 to wait until the level of the FOK signal becomes High. Then, when the level of the FOK signal becomes High next time, the focus detection unit 43 increments the value retained in the FH register again in Step S9. As a result, the value retained in the FH register is no longer 1. Therefore, the focus detection unit 43 judges in subsequent processing of Step S10 that it is the second switching from Low level to High level for the FOK signal.

When it is judged in Step S10 that the value retained in the FH register is not 1 and the switching is the second switching from Low level to High level for the FOK signal, the focus detection unit 43 performs the processing of Step S4 to detect the FZC signal due to the signal surface-reflected signal T as in the case where it is predicted that the medium surface-reflected signal S will not satisfy the focus detection conditions. In this case, the focus detection unit 43 detects the output signal satisfying the focus detection conditions after waiting until the level of the FOK signal becomes High from Low and then becomes Low again through the processing from Steps S8 to S11. Even if the FZC signal due to the medium surface-reflected signal S is detected by the servo signal processing unit 18, it is predicted that the FZC signal is generated between a time at which the level of the FOK signal becomes High from Low for the first time, and a time at which the level of the FOK signal becomes Low again. Therefore, according to the processing of the flow illustrated in FIG. 5, the FZC signal due to the medium surface-reflected signal S is ignored.

Figure 5:
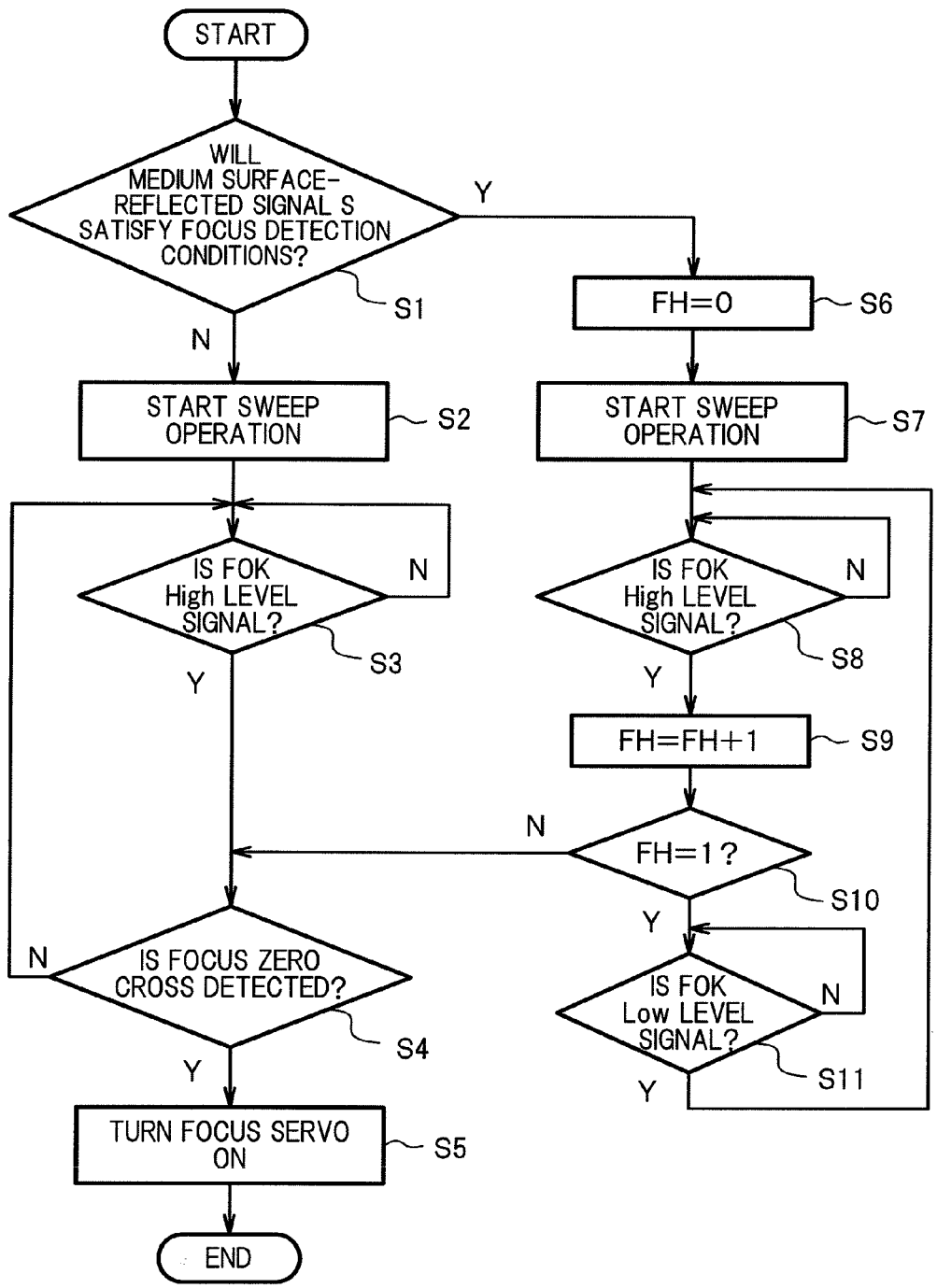
FIG. 5 is a flowchart illustrating an example of a flow of focus detection processing performed by the optical disc apparatus according to the present invention.

Though not illustrated in the flow of FIG. 5, when, for example, the optical disc medium M includes two or more data recording layers and the second or subsequent data recording layer as viewed from the optical pickup 13 side is a layer from which data is to be read or on which the data is to be written, the focus detection unit 43 counts the FZC signals which are detected while the level of the FOK signal is High in the processing of Step S4. After the detection of the number of FZC signals corresponding to the number of signal surfaces up to the signal surface from which the data is to be read or on which the data is to be written, the control for turning the focus servo ON in Step S5 is performed. As a result, the focus detection unit 43 counts only the signal surface-reflected signals T regardless of whether or not the level of the FOK signal becomes High due to the medium surface-reflected signal S to detect the state where the focus of the objective lens 36 is on the signal surface from which the data is to be read or on which the information is to be written.

When the signal satisfying the focus detection conditions is not successfully detected even after elapse of a predetermined time from the start of the sweep operation from the initial position or when the reading of the information from or the writing of the information on the signal surface fails after the focus servo is turned ON in Step S5, it is determined that an error occurs. Therefore, the focus detection processing is performed again (a retry operation is performed). There is a possibility that such a retry operation needs to be performed even when the prediction performed by the prediction unit 42 is not correct. Specifically, when the medium surface-reflected signal S satisfies the focus detection conditions during the focus detection processing, even though the prediction unit 42 predicts that the medium surface-reflected signal S will not satisfy the focus detection conditions, there is a fear that the optical disc apparatus 1 will erroneously try to read or write the data while the focus is not on the signal surface but on the medium surface of the optical disc medium M. Moreover, when the level of the PI signal of the medium surface-reflected signal S does not exceed the PI signal threshold value Th1 during the focus detection processing, even though the prediction unit 42 predicts that the medium surface-reflected signal S will satisfy the focus detection conditions, there is a fear that the predetermined time will elapse without detecting the signal surface-reflected signal T.

Therefore, in such a case, the focus detection unit 43 performs the retry operation. In general, the retry operation is an operation for re-implementing the focus detection processing after changing the focus detection conditions. In this embodiment, the focus detection unit 43 may change a method of changing the focus detection conditions for the retry operation according to the result of prediction about the medium surface-reflected signal S, based on which the first focus detection processing has been performed.

As a specific example, the focus detection unit 43 changes the FE signal threshold value Th2 for detecting the FZC signal to perform the retry operation. In this case, when the focus detection processing performed based on the prediction that the medium surface-reflected signal S will not satisfy the focus detection conditions fails, the focus detection unit 43 increases the FE signal threshold value Th2 by a predetermined differential value ΔTh2 to perform the retry operation. When the first retry operation fails, the FE signal threshold value Th2, which is obtained by reducing the initial FE signal threshold value Th2 used for the first focus detection processing by the predetermined differential value ΔTh2, is used to perform the second retry operation. Thereafter, while gradually increasing the predetermined differential value ΔTh2, the focus detection unit 43 alternately repeats the retry operation with the FE signal threshold value Th2 larger than the initial FE signal threshold value Th2 and the retry operation with the FE signal threshold value Th2 smaller than the initial FE signal threshold value Th2 to attempt to detect the signal surface-reflected signal T.

On the other hand, when the focus detection processing performed based on the prediction that the medium surface-reflected signal S will satisfy the focus detection conditions fails, the FE signal threshold value Th2 is reduced by the predetermined differential value ΔTh2 to perform the first retry operation. Then, the next retry operation is performed by using the FE signal threshold value Th2 larger than the initial FE signal threshold value Th2 by the predetermined differential value ΔTh2. By changing the method of changing the focus detection conditions for performing the retry operation according to the result of prediction as described above, it is expected that the focus detection processing will be successfully performed with a smaller number of the retry operations if the focus detection processing fails due to a prediction error in the detection of the medium surface-reflected signal S.

The focus detection unit 43 may change not only the FE signal threshold value Th2 but also the PI signal threshold value Th1 according to the result of prediction made by the prediction unit 42 in the retry operation which is performed when the focus detection processing fails. Alternatively, when the focus detection processing fails for the first time, the focus detection unit 43 may perform the retry operation based on a prediction opposite to the result of prediction made by the prediction unit 42.

According to the optical disc apparatus 1 according to this embodiment described above, it is predicted whether or not the medium surface-reflected signal S will satisfy the focus detection conditions prior to the implementation of the focus detection processing. Then, according to the result of prediction, the method for the focus detection processing is changed. As a result, even when it is difficult to set the focus detection conditions that allow only the signal surface-reflected signal T to be detected without detecting the medium surface-reflected signal S, the signal surface-reflected signal T can be detected with good accuracy.

The embodiment of the present invention is not limited to that described above. For example, although the focus state is detected with the combination of the FE signal and the PI signal in the above-mentioned description, the signal used for detecting the focus state is not limited thereto. Only any one of the FE signal and the PI signal, or other types of signals, may be used to detect the focus state. Moreover, the conditions to be satisfied by the FE signal and the PI signal are not limited to those described above. For example, the optical disc apparatus 1 may use a plurality of threshold values to detect a time point where the FE signal crosses zero.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical disc apparatus for reading information recorded on an optical disc medium, comprising:
   an optical pickup including an objective lens, for outputting an output signal according to reflected light from the optical disc medium;
   a drive unit for relatively moving the objective lens included in the optical pickup with respect to a medium surface of the optical disc medium in a direction of changing a distance to the medium surface;
   focus detection means for detecting a state where the output signal from the optical pickup satisfies a predetermined detection condition as a focus state where a focus of the objective lens is on a signal surface of the optical disc medium while the objective lens is being relatively moved by the drive unit with respect to the medium surface, for reading the information recorded on the optical disc medium;
   signal level measurement means for measuring a level of a first reflected signal corresponding to reflected light from the medium surface prior to the reading of the information recorded on the optical disc medium; and
   prediction means for predicting a level of a second reflected signal corresponding to reflected light from the medium surface that is obtained while the focus detection means is detecting the focus state after the prediction means performs the predicting, based on the measured level of the first reflected signal and a predetermined target value set for the signal surface, to predict whether or not the second reflected signal will satisfy the predetermined detection condition, for the detecting of the focus state, wherein
   the focus detection means uses a result of the predicting to detect the focus state, and as a result of the predicting, when it is predicted that the second reflected signal will satisfy the predetermined detection condition, the focus detection means detects, as the focus state, a state where the predetermined detection condition is satisfied for a second time while the objective lens is being relatively moved from an initial position with respect to the medium surface, and as the result of the predicting, when it is predicted that the second reflected signal will not satisfy the predetermined detection condition, the focus detection means detects, as the focus state, a state where the predetermined detection condition is satisfied for a first time while the objective lens is being relatively moved from the initial position with respect to the medium surface.

2. An optical disc apparatus according to claim 1, wherein the signal level measurement means further measures a level of a third reflected signal corresponding to reflected light from the signal surface, and wherein the prediction means performs the predicting based on a ratio between the level of the first reflected signal and the level of the third reflected signal.

3. An optical disc apparatus according to claim 1, wherein the predetermined detection condition is satisfied after a level of the output signal exceeds a predetermined value and then becomes less than the predetermined value again while the objective lens is being relatively moved in a direction becoming closer to the medium surface.

4. A method of controlling an optical disc apparatus for reading information recorded on an optical disc medium, the optical disc apparatus comprising: an optical pickup including an objective lens, for outputting an output signal according to reflected light from the optical disc medium; and a drive unit for relatively moving the objective lens included in the optical pickup with respect to a medium surface of the optical disc medium in a direction of changing a distance to the medium surface, the method comprising:

detecting a state where the output signal from the optical pickup satisfies a predetermined detection condition as a focus state where a focus of the objective lens is on a signal surface of the optical disc medium while the objective lens is being relatively moved by the drive unit with respect to the medium surface, for reading the information recorded on the optical disc medium;

measuring a level of a first reflected signal corresponding to reflected light from the medium surface prior to the reading of the information recorded on the optical disc medium; and predicting a level of a second reflected signal corresponding to reflected light from the medium surface that is obtained while detecting the focus state after the predicting, based on the measured level of the first reflected signal and a predetermined target value set for the signal surface, to predict whether or not the second reflected signal will satisfy the predetermined detection condition, for the detecting of the focus state, wherein the detecting step comprises using a result of the predicting to detect the focus state, and as a result of the predicting, when it is predicted that the second reflected signal will satisfy the predetermined detection condition, the detecting step detects, as the focus state, a state where the predetermined detection condition is satisfied for a second time while the objective lens is being relatively moved from an initial position with respect to the medium surface, and as the result of the predicting, when it is predicted that the second reflected signal will not satisfy the predetermined detection condition, the detecting step detects, as the focus state, a state where the predetermined detection condition is satisfied for a first time while the objective lens is being relatively moved from the initial position with respect to the medium surface.

5. A non-transitory computer readable information storage medium storing a program for controlling an optical disc apparatus for reading information recorded on an optical disc medium, the optical disc apparatus comprising: an optical pickup including an objective lens, for outputting an output signal according to reflected light from the optical disc medium; and a drive unit for relatively moving the objective lens included in the optical pickup with respect to a medium surface of the optical disc medium in a direction of changing a distance to the medium surface, the program controlling a computer to function as:

focus detection means for detecting a state where the output signal from the optical pickup satisfies a predetermined detection condition as a focus state where a focus of the objective lens is on a signal surface of the optical disc medium while the objective lens is being relatively moved by the drive unit with respect to the medium surface, for reading the information recorded on the optical disc medium;

signal level measurement means for measuring a level of a first reflected signal corresponding to reflected light from the medium surface prior to the reading of the information recorded on the optical disc medium; and prediction means for predicting a level of a second reflected signal corresponding to reflected light from the medium surface that is obtained while the focus detection means is detecting the focus state after the prediction means performs the predicting, based on the measured level of the first reflected signal and a predetermined target value set for the signal surface, to predict whether or not the second reflected signal will satisfy the predetermined detection condition, for the detecting of the focus state, wherein the focus detection means uses a result of the predicting to detect the focus state, and as a result of the predicting, when it is predicted that the second reflected signal will satisfy the predetermined detection condition, the focus detection means detects, as the focus state, a state where the predetermined detection condition is satisfied for a second time while the objective lens is being relatively moved from an initial position with respect to the medium surface, and as the result of the predicting, when it is predicted that the second reflected signal will not satisfy the predetermined detection condition, the focus detection means detects, as the focus state, a state where the predetermined detection condition is satisfied for a first time while the objective lens is being relatively moved from the initial position with respect to the medium surface.

* * * * *